United States Patent
Lewis

[15] 3,684,236
[45] Aug. 15, 1972

[54] COMBINED HYDRAULIC DUMP AND CONTROL VALVE STRUCTURE

[72] Inventor: Ivor J. Lewis, Secane, Pa.

[73] Assignee: Westinghouse Electric Corporation, Pittsburgh, Pa.

[22] Filed: Aug. 17, 1970

[21] Appl. No.: 64,359

[52] U.S. Cl. .................................. 251/28, 251/33
[51] Int. Cl. ............................................. F16k 31/143
[58] Field of Search ................. 251/28, 26, 29, 38, 33

[56] References Cited

UNITED STATES PATENTS

| | | | |
|---|---|---|---|
| 3,125,319 | 3/1964 | Arbogast et al. | 251/26 X |
| 2,645,061 | 7/1953 | Henkel et al. | 251/26 X |
| 1,843,953 | 2/1932 | McKinney | 251/28 X |
| 2,668,556 | 2/1954 | Meyer | 251/29 |

*Primary Examiner*—Arnold Rosenthal
*Attorney*—A. T. Stratton and F. P. Lyle

[57] ABSTRACT

A valve structure for dumping and/or controlling hydraulic fluid for actuating a servo-motor system comprising a first movable valve member and a second movable valve member both slidably disposed within the housing structure of the valve. First and second pressurized fluids, responsive to external signals, cooperatively regulate the movement of both valve members in the closing direction, to establish and to control the pressure of the actuating hydraulic fluid. The second pressurized fluid independently regulates the movement of the second valve member in the closing direction to block and unblock the actuating fluid in the servo-motor system. On loss of pressure from the external signals, a spring member associated with each valve member moves each corresponding valve member in the opening direction, to either a partially open position to control the actuating fluid pressure, or a fully open position to dump the actuating fluid.

The valve structure is employed in a servo-motor system which is used to regulate a steam control valve. This control valve is used in a steam inlet conduit for a steam turbine to regulate the quantity of steam supplied to the turbine.

3 Claims, 3 Drawing Figures

PATENTED AUG 15 1972 3,684,236

COMBINED HYDRAULIC DUMP AND CONTROL VALVE STRUCTURE

BACKGROUND OF THE INVENTION

This invention relates generally to a combined hydraulic dump and control valve for regulating hydraulic fluid for a servo-motor actuating system. A typical application of this type of servo-motor system is to regulate the steam control valve on a steam inlet conduit for a steam turbine.

Generally, on the steam inlet conduit to the high pressure turbine unit, there is a fast responding stop valve and a generally slower responding control valve. The stop valve is used to cut off or supply steam to the turbine, and the control valve is used to regulate the quantity of steam supplied to the turbine between the full open or full close positions of the stop valve.

As steam turbines continue to increase in size, larger quantities of steam must be supplied to the turbine, and the inlet conduits and stop and control valves must correspondingly increase in size. As the mass flow of the steam increases through the inlet conduit, the impact forces due to the closing of the stop valve upon a trip oil signal, such as an overspeed signal or a low pressure signal, increases substantially. For example, in large steam turbines, a stop valve having an unbalanced 25 inch diameter disc which is subjected to steam pressure of 1,000 p.s.i., results in a closing force of approximately 490,000 lbs.

Many solutions have been proposed to reduce the mechanical injury to the seating member of the disc. One such solution is to design a control valve that could match the closing time performance of the stop valve (between 0.1 and 0.2 seconds) so as to create a greater pressure drop across the balanced steam control valve, and reduce the pressure drop across the unbalanced stop valve. This causes less pressure to act on the stop valve and to allow the steam trapped between the two valves to act as a cushion, thus minimizing the effect of the impact forces on closing. To enable the control valve to quickly close, requires a dump valve capable of quickly dumping the actuating fluid of the servo-motor system in response to the same emergency trip signals as the stop valve.

It would be desirable then, to design a reliable valve which can control and/or quickly dump the actuating fluid of a servo-motor system.

SUMMARY OF THE INVENTION

This invention relates to a valve structure for dumping and/or controlling the hydraulic fluid for a servo-motor system.

The valve structure comprises a housing, a central bore within said housing, and first and second valve members slidably disposed within the bore. One portion in the housing defines a first cavity or trip fluid cavity which is supplied with emergency trip fluid. A second portion in the housing defines a second cavity or control fluid cavity, which is supplied with pressurized control fluid. A control fluid drain conduit is secured to the control fluid cavity and when the first valve member is in the closed or no dump position, the valve prevents fluid communication between the control fluid cavity and the control fluid conduit. An actuating fluid inlet conduit is in fluid communication with an actuating fluid chamber within the housing. There is an actuating fluid exit conduit attached to the chamber and when the second valve member is in the seated position, the second valve member prevents fluid communication between the chamber and the exit conduit.

The force from the pressurized emergency trip fluid maintains the first valve member in the seated position and cooperates with the control fluid to maintain the second valve member in the seated position. The control fluid independently regulates the second valve member in the partially open position to regulate actuating fluid pressure of the servo-motor system.

A first spring member disposed within the central bore is secured to the first valve member and supplies the force to move the first valve member into an open or dump position. A second spring member disposed within the bore supplies the force to raise the second valve member to a dump position.

In a normal servo-motor operating position, pressurized emergency trip fluid exerts a force on the first valve member thereby closing the control fluid drain conduit. The control fluid pressurizes the control fluid cavity, and the second valve member blocks the actuating fluid in the actuating fluid chamber from the exit conduit, thereby maintaining the actuating fluid pressure of the servo-motor system. Upon a signal from an external source tripping the emergency fluid, the pressure of the trip fluid in the trip fluid cavity quickly decays, enabling the first spring member to quickly and dependably move the first valve member to a dump position, thereby uncovering the control fluid drain conduit and dumping the control fluid into the control fluid exit conduit. This enables the second spring member to quickly move the second piston member to a dump position, thereby draining the actuating fluid in the actuating fluid chamber through the exit conduit.

DESCRIPTION OF THE PREFERRED EMBODIMENT

Figure 1:
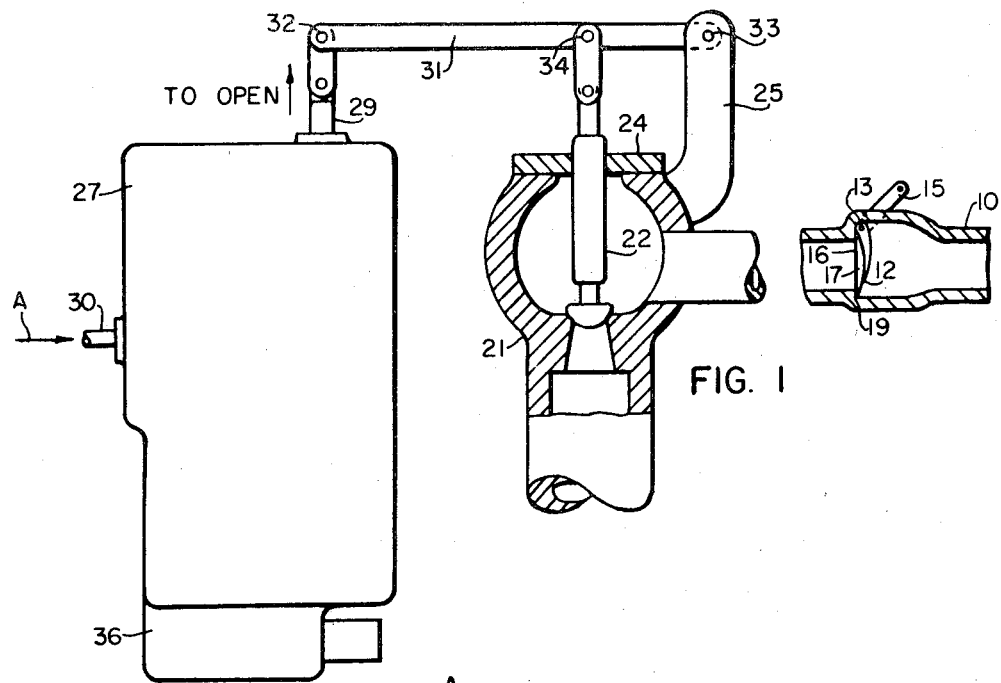
FIG. 1 is an elevational view of a servo-motor structure embodying the present invention.

Referring to the drawings in detail, in FIG. 1 there is shown a typical steam inlet conduit 10 for conducting hot motive steam to a turbine unit (not shown). The flow of steam through conduit 10 is monitored by stop valve 12, shown mounted to conduit 10 and pivoted around pin 13. The stop valve is actuated by an external linkage or crank 15 which in turn is actuated by means well known in the art (not shown). Stop valve 12 is shown in the closed position so that a disc-shaped face 16 of a spherical cap closure portion 17 rests against an annular seating surface 19 within the conduit 10.

The steam inlet 10 is secured to a steam admission valve or control valve 21, of the well known type as shown in O.N. Bryant U.S. Pat. No. 3,026,889 issued Mar. 27, 1962 and assigned to the same assignee as this invention. The valves 10 and 21 are interconnected so that when the stop valve 12 is in the open position, steam flow rate to the turbine unit (not shown) is regulated by the control valve 21.

The control valve 21 has a movable plug member 22, which valve is further provided with a cover plate 24 to guide the axial movement of the plug member. A fulcrum member 25 is also connected to the valve body 21. A servo-motor 27 actuate the movement of the plug member 22 of the control valve 21. A piston rod 29 moves vertically, as indicated by the arrow, and is pivotally connected to one end of a lever 31 by pivot 32 and is connected to the fulcrum member 25, at its other end by pivot 33. Intermediate its end portions, the lever 31 is pivotally connected by pivot 34 to the movable plug member 22.

As well known in the art, the servo-motor 27 has a servo-piston member (not shown) which moves the piston rod 29 in a vertical direction in response to the force from hydraulic actuating fluid. The actuating fluid indicated by arrow A enters the servo-motor 27 through conduit 30. Part of the servo-motor system comprises an oil relay valve mechanism (not shown) which regulates the pressure of the actuating fluid to properly position the servo-piston member to maintain the plug member 22 of the control valve 21 in the proper control position.

Under certain conditions, such as overspeed from loss of generator load or low system pressure, a dump valve 36 is provided to dump the hydraulic actuating fluid of the servo-motor system. As shown in FIG. 1, the dump valve 36 is shown in the preferred horizontal position and is secured to the servo-motor 27 by any suitable means (not shown), but is not limited to that position.

Figure 2:
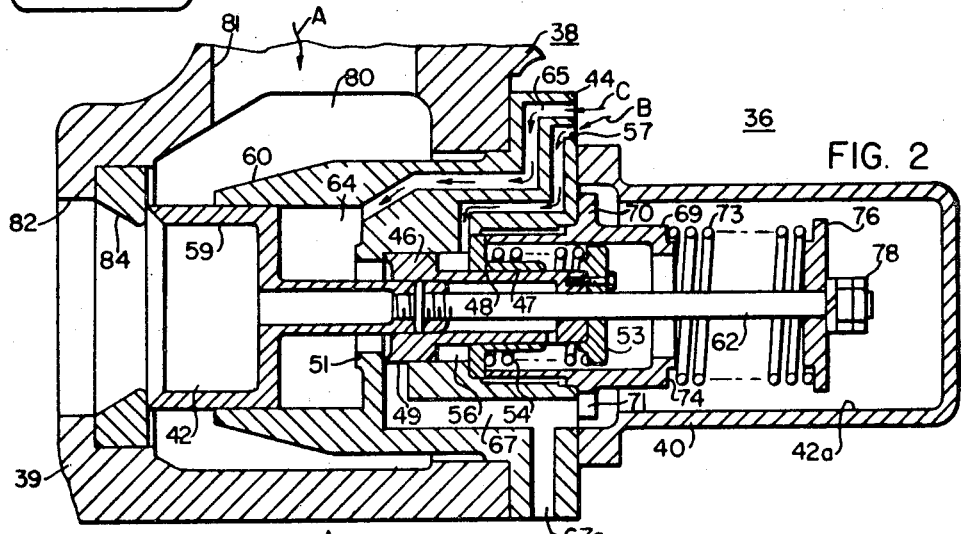
FIG. 2 is an enlarged, axial sectional view of the combined dump and control valve in FIG. 1, shown in one position.

Referring to FIG. 2, it can be seen that the dump valve structure 36 is comprised of a housing 38, which is annular in shape. The housing 38 is comprised of a main body portion 39 and a cap portion 40, which is of an inverted cup-shape. The cap portion 40 is secured to the main body portion 39 by any suitable means (not shown).

A central bore 42 is disposed within the housing 38. An annular sleeve member 44 is disposed within the central bore 42. A first valve member 46 is concentrically disposed within the central bore 42 and the valve is guided along the central axis by the annular sleeve 44. An annular bushing member 47 is also disposed within the sleeve member 44 to slidably support the first valve member 46. An annular flange portion 48 of the sleeve 44 acts as a shoulder to stop the axial movement of a disc portion 49 of the first valve member 46 when moved to the right. The opposite surface of the disc portion 49 seats on an annular shoulder 51 in the sleeve member 44. A disc-shaped capping portion 53 is secured to the first valve member 46 on the side of the valve member opposite the disc portion 49. A first spring member 54 is disposed between the movable capping portion 53, and the flange 48 of the stationary bushing member 47. The spring member 54 axially moves the valve member 46 from a seated position shown in FIG. 2 to a dump position shown in FIG. 3.

The first valve member 46, the sleeve member 44 and the bushing member 47 jointly define a first cavity 56 which is ring-shaped, the cavity 56 being within the central bore 42. This cavity 56 is the emergency trip-fluid cavity.

A first fluid inlet 57 provides emergency trip fluid (indicated by arrow B) from a source (not shown) to the trip-fluid cavity 56. This emergency trip-fluid may be the same fluid which activates the stop valve 12, shown in FIG. 1, to close in response to the same emergency signals.

A second valve member 59 is also concentrically disposed within the central bore 42. The second valve member 59 is slidably guided by an axially extending cylindrical portion 60 of the annular sleeve member 44. A valve stem 62 is screw threaded to the center of the second valve member 59 and is coaxial with the first valve member 46. The first valve member 59 and the valve stem 62 are slidably guided by the second piston member 46 and its disc-shaped capping portion 53. The valve stem 62 extends axially into the central bore 42a in the cap portion 40 of the housing 38.

The sleeve 44, the second valve member 59, and the first valve member 46, jointly define a second cavity 64 which is annularly shaped. The second cavity 64 is provided with control fluid indicated by arrow C by a second fluid inlet 65 or control fluid inlet. A plurality of angularly spaced control fluid drain conduits 67 communicate with the second cavity 64 and are blocked and unblocked by the disc portion 49 of the first valve member 46.

A cylindrical member 69 is concentrically disposed within the sleeve 44 and axially extends into the cap portion 40 of the housing 38. Approximately midway of the member 69 is a radially extending annular shoulder 70. A plurality of axially extending holes 71 are angularly spaced around the shoulder 70 and are in fluid communication with the control fluid drain conduits 67 and the cavity 42a within the cap portion 40. This arrangement provides a convenient reservoir for the drained control fluid to travel a relatively short distance from the second cavity 64, thus eliminating a time delay since the cavity 42a can more slowly drain after the dumping of control fluid from the second cavity.

A movable disc-shaped support member 76 is secured to the cap portion end of the valve stem 62 by a nut 78 which is screw threaded onto the stem. A second spring member 73 is disposed between a shoulder 74 on the stationary cylindrical member 69 and the movable support member 76. The second spring member 73 moves the support member 76, the connected valve stem 62 and the second valve member 59 axially from the seated position shown in FIG. 2 to the dump position shown in FIG. 3.

The portion of the central bore 42 in the main body portion 39 is an annular actuating fluid chamber 80. The chamber 80 is defined by the main body portion 39 and the axially extending portion 60 of the sleeve member 44. The actuating fluid chamber 80 has an actuating fluid inlet conduit 81 which is transverse to the central axis of the valve 36, and an axially extending actuating fluid exit conduit 82, the inlet and outlet conduits 81 and 82 being at right angles, but are not limited thereto. The second valve member 59 blocks and unblocks the exit conduit 82 to permit the build-up of actuating fluid pressure from the servo-motor 27. In the blocking or no dump position, the second valve member 59 is seated against an annular seating member 84 disposed in the exit position 82 of the main body 39.

To operate the turbine unit, an external signal actuates suitable means to rotate the crank 15 (FIG. 1) and open the stop valve 12. The servo-motor 27 actuates the control valve 21 in the following manner. Actuating fluid A enters the servo-motor 27 through conduit 30. The actuating fluid is pressurized by an oil relay system within the servo-motor body to regulate the position of the piston rod 29.

Figure 3:
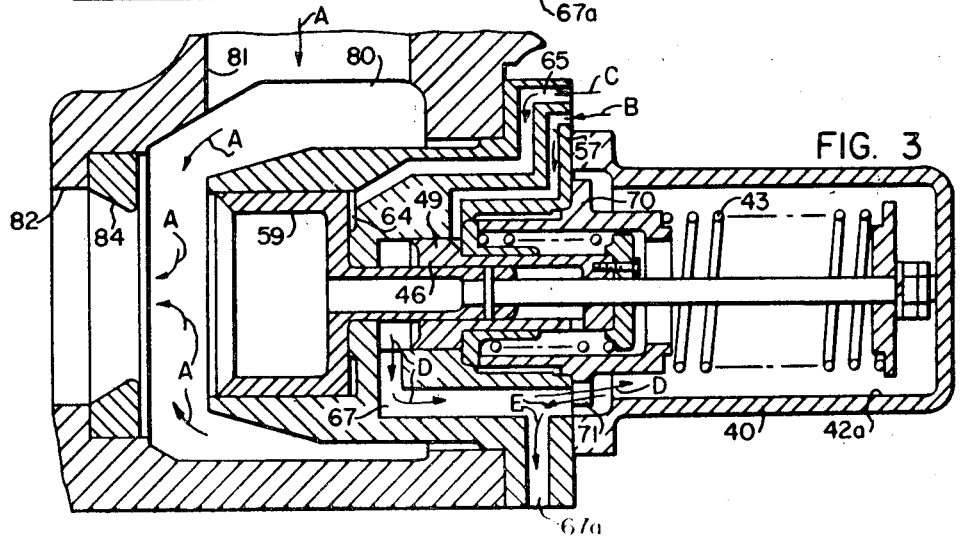
FIG. 3 is a view similar to FIG. 2 but with the valve in another position.

Initially, the dump valve 36 is in the open position as shown in FIG. 3 but to maintain the actuating fluid pressure, the dump valve 36 must be in the closed position as shown in FIG. 2. Actuating fluid from the servo-motor 27 enters the dump valve 36 through the actuating fluid inlet conduit 81 and flows into the actuating fluid chamber 80. When the second valve member 59 is in the dump position (FIG. 3), the actuating fluid dumps through the actuating fluid exit conduit 82 as indicated by the arrows A.

To close the dump valve 36 and correspondingly open the plug member 22 in the control valve 21 (FIG. 1), emergency trip fluid indicated by the arrow B, is introduced to the first fluid inlet 57. The force from the pressurized fluid B pushes on the disc portion 49 of the first valve member 46, forcing the first piston valve member 46 into a position blocking the control fluid drain conduits 67 (FIG. 1). Once the first valve member 46 blocks the control fluid drain conduits 67, then control fluid, indicated by the arrow C entering the second inlet 65, can build up pressure and move the second valve member 59 from a dump position (FIG. 3) to a seated position against the seating member 84 to block the drainage of actuating fluid A (FIG. 2). On seating of the second valve member 59, the actuating fluid pressure builds up and moves the piston rod 29 in an opening direction (FIG. 1) and lifts the plug member 22 to allow steam to flow through the control valve 21.

As previously mentioned, a serious problem results because of the large seating force acting on the seating surface 19 (FIG. 1) when the stop valve 12 is quickly closed. The disclosed dump valve 36 is designed to enable the control valve 21 to match the closing time performance of the stop valve 12 which is in the range of 0.1 to 0.2 seconds.

Upon an external emergency trip signal, the emergency fluid pressure in the first fluid inlet 57 and the first cavity 56 decays readily, the first cavity being small relative to the second cavity 64. The first spring member 54 cooperates with the fluid in the second cavity producing the acceleration force which moves the first valve member 46 quickly and independently from a closed position (FIG. 2) to a dump position (FIG. 3), unblocking the control fluid drain conduits 67. The control fluid from the second cavity 64, very quickly drains into the drain conduits 67 as indicated by the arrows D in FIG. 3. The drain conduits 67 are considerably larger than the inlet conduit 65. The drain conduits 67 pass through the holes 71 in the shoulder 70 and enter into the bore 42a in the cap portion 40. This allows a short drainage route for quickly dumping the control fluid and a reservoir to store the fluid. After the control fluid is drained from the second cavity into the bore 42a, it flows through conduit 67 to a separate smaller diameter annular conduit 67a to a fluid reservoir (not shown) as indicated by the arrows E in a time unrelated to the trip event. Upon decay of control fluid pressure in the second cavity 64, the second valve member 59 moves in an axial direction to a dump position from the force of the compression spring 73 and the actuating fluid is dumped.

The dump valve 36 also regulates and controls the actuating fluid pressure within the servo-motor 27, i.e., the control fluid in the second cavity 64 independently regulates the second valve member 59 when the first valve member 46 is in a blocking position of the control fluid drain conduits 67. By slightly decreasing control fluid pressures, the spring 73 partially opens the first valve 59 to allow partial drainage of the actuating fluid in the actuating fluid chamber 80 and thereby regulates the pressure of the actuating fluid in the servo-motor 27 for certain low ranges of control fluid pressure. As previously mentioned, the oil relay valve (not shown) of servo-motor 27 also regulates the position of the piston rod 29. One positioning system can act as a backup for the other or each can position the rod 29 independently from the other in response to different control signals.

What is shown then is a valve 36 which can quickly dump and/or control the actuating fluid of the servo-motor 27. The valve structure 36 is capable of quickly dumping the actuating fluid while still allowing the versatility needed to independently regulate the actuating fluid pressure.

While the invention is shown in one form, it will be obvious to those skilled in the art that it is not so limited, but is suceptible of various other changes and modifications without departing from the spirit thereof.

What is claimed is:

1. A hydraulically actuated valve for controlling and dumping actuating fluid of a servo-motor system comprising:

a housing;

first movable valve member concentrically disposed in said housing;

a second movable valve member concentrically disposed in said housing;

first and second means for providing fluid pressure acting directly on and moving said first and second valve members, respectively, in one direction to seat said valve members and maintain the pressure of the actuating fluid;

first spring means for moving said first valve member in dumping direction opposite to said seating direction upon loss of pressure from said first fluid providing means;

second spring means for moving said second valve member in said dumping direction upon loss of pressure from said second fluid providing means;

said first valve member being disposed to dump said second fluid upon loss of pressure from said first fluid providing means;

said housing having an actuating fluid chamber, an inlet actuating fluid conduit and an outlet actuating fluid conduit, said conduits being in communication with said chamber and said second valve member being so disposed within said housing as to be in blocking relation with said outlet conduit when moved in said seated direction, said valve members being so disposed within said housing as to be free from forces in actuating direction applied thereto by said actuating fluid when the second valve member is in its seated position;

said second valve member being so disposed as to be actuated by said second fluid providing means for independently moving said second valve member to control the flow of actuating fluid between said inlet and outlet conduit and to dump said actuating fluid upon loss of pressure of said second fluid.

2. The structure recited in claim 1 wherein a portion of second valve member is slidably disposed within the first valve member.

3. The structure recited in claim 1, wherein the first and second valve members are so disposed within the housing that the second fluid providing means also acts directly on the first valve member urging it in a direction opposite said seating direction, the second fluid providing means thereby cooperating with the first spring means to accelerate the first valve member rapidly in a direction opposite said seating direction to rapidly drop the pressure of said second fluid to cause said second valve member to move rapidly in a direction opposite said seating direction to rapidly dump said actuating fluid.

* * * * *